(12) United States Patent
Oumi

(10) Patent No.: US 7,439,978 B2
(45) Date of Patent: Oct. 21, 2008

(54) INFORMATION PROCESSING SYSTEM, INFORMATION PROCESSING METHOD, STORAGE MEDIUM, AND PROGRAM

(75) Inventor: Hiroyuki Oumi, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 257 days.

(21) Appl. No.: 10/934,924

(22) Filed: Sep. 2, 2004

(65) Prior Publication Data

US 2005/0052454 A1   Mar. 10, 2005

(30) Foreign Application Priority Data

Sep. 5, 2003   (JP) ............................. 2003-314268

(51) Int. Cl.
  *G06T 11/20* (2006.01)
(52) U.S. Cl. ..................................... 345/443; 345/441
(58) Field of Classification Search .................. 345/443
  See application file for complete search history.

(56) References Cited

U.S. PATENT DOCUMENTS 5,371,845 A * 12/1994 Newell et al. ............... 715/808
5,548,698 A *  8/1996 Smith et al. ................. 345/660
5,615,321 A *  3/1997 Corn .......................... 345/643
5,712,656 A *  1/1998 Ikeda et al. ................. 345/642
7,054,476 B2 *  5/2006 Oosawa et al. .............. 382/132
2002/0048394 A1 *  4/2002 Nagata et al. ............... 382/132
2002/0057828 A1 *  5/2002 Oosawa et al. .............. 382/132

FOREIGN PATENT DOCUMENTS

JP   2000-279399   10/2000

OTHER PUBLICATIONS

"A Guide to X-ray Image Measurement in Orthopedic Surgery", 1990.*
Harvey et al., Measurement of lumbar spinal flexion-extension kinematics from lateral radiographs: simulation of the effects of out of plane movement and errors in reference point placement, Department of Bio-Medical Physics and Bio-Engineering, University of Aberdeen, Elsevier Science 1998, pp. 403-409.*

* cited by examiner

*Primary Examiner*—M Good Johnson
(74) *Attorney, Agent, or Firm*—Canon U.S.A. Inc., I.P. Division

(57) ABSTRACT

An information processing system includes a display unit for displaying an image; a drawing unit for drawing a first straight line and a second straight line on the image displayed by the display unit in accordance with an input operation by a user; and a geometrical-value calculating unit for calculating a value indicating a geometrical relationship between the first and second straight lines drawn by the drawing unit.

17 Claims, 13 Drawing Sheets

(1) (X1, Y1)

(1) (X1, Y1)

101

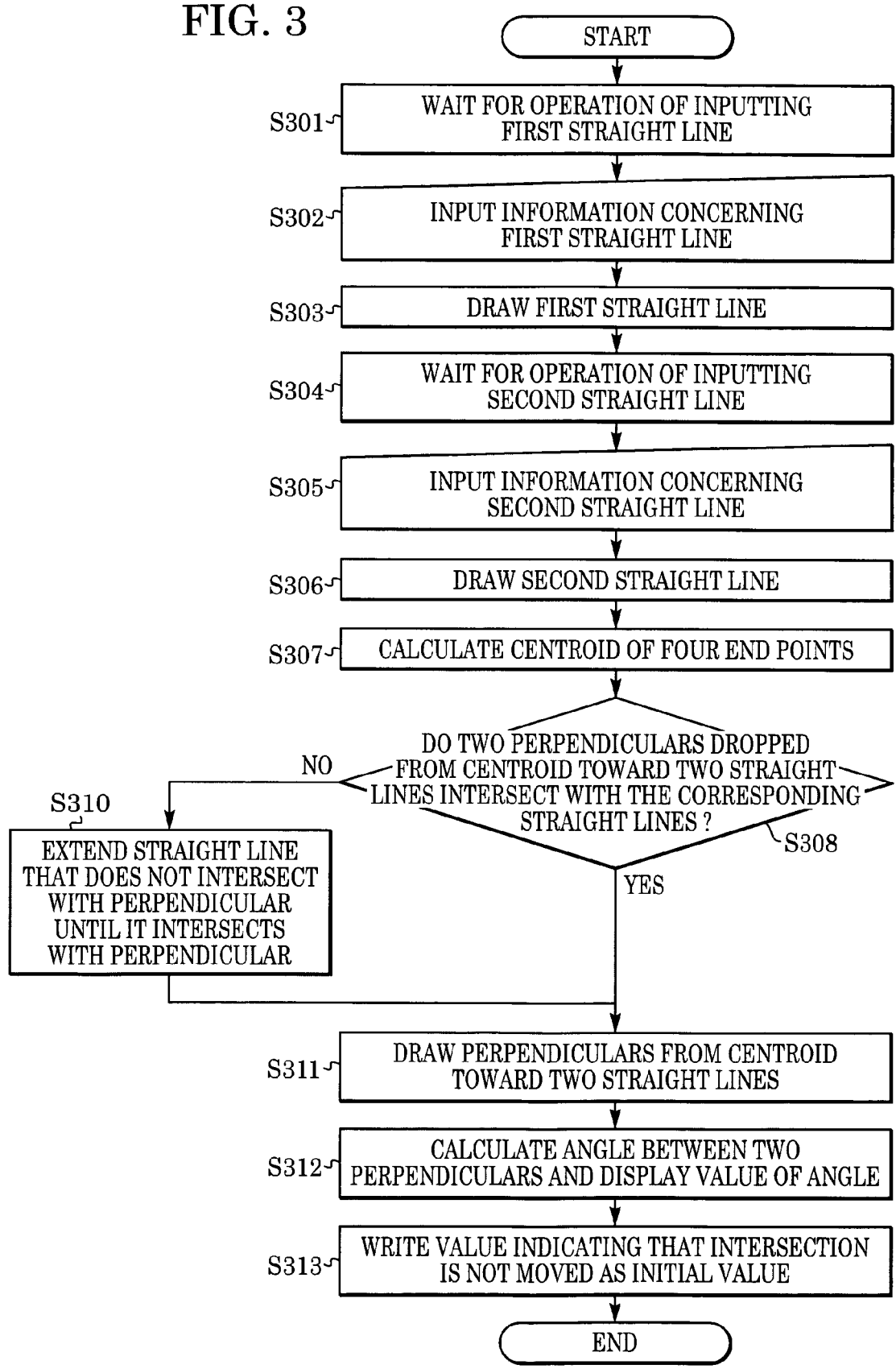

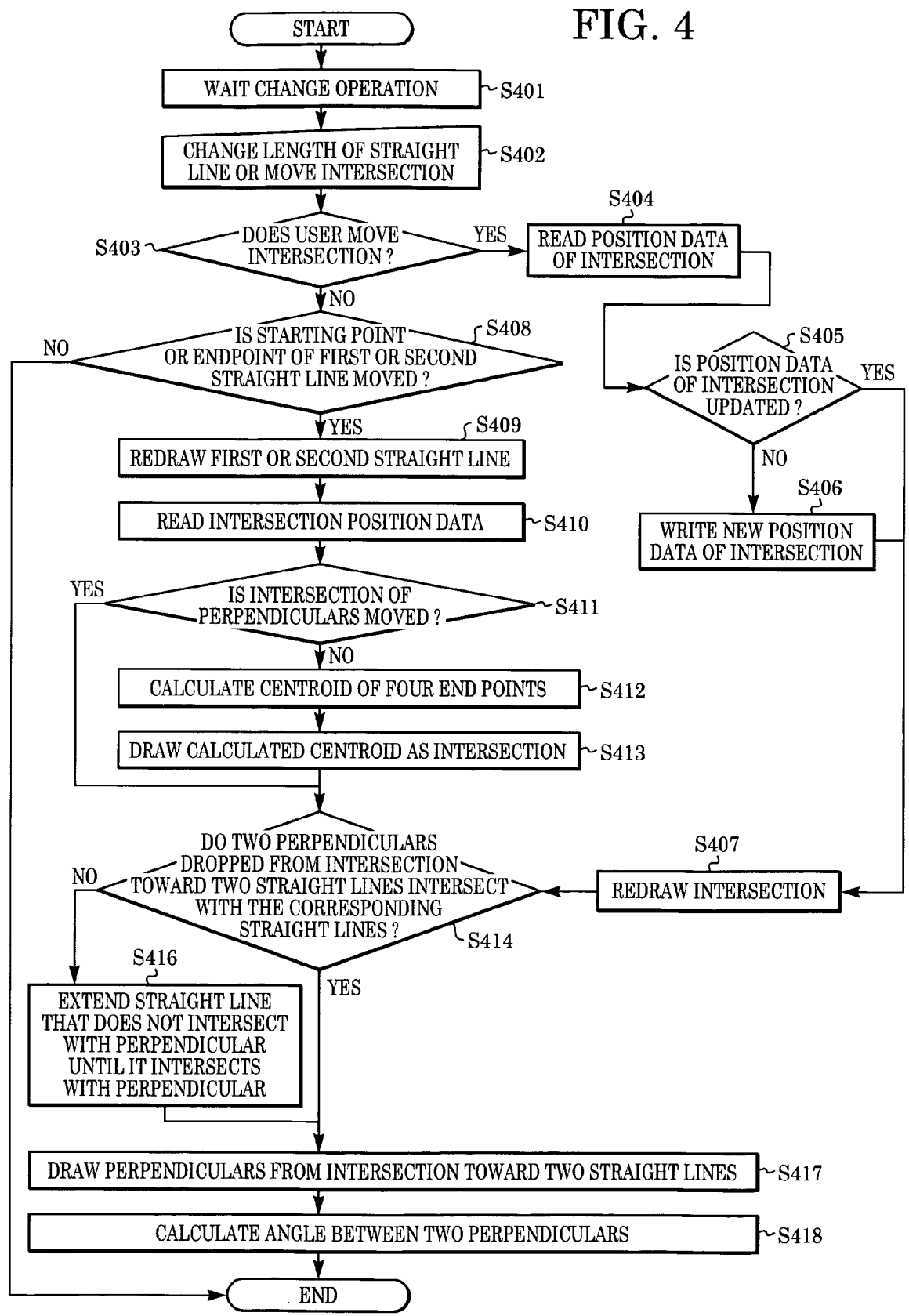

INFORMATION PROCESSING SYSTEM, INFORMATION PROCESSING METHOD, STORAGE MEDIUM, AND PROGRAM

BACKGROUND OF THE INVENTION

1. Field of the Invention

The present invention relates to information processing systems for geometrically measuring images. More particularly, the present invention relates to an information processing system and an information processing method for geometrically measuring medical images, a storage medium, and a program.

2. Description of the Related Art

In recent years, radiography using solid-state imaging devices or the like have been developed and digital radiography of X-ray images using a computer has been gradually realized. Using such digital radiographic devices allows the contrast of X-ray images that have been already radiographed to be adjusted or allows failed images to be re-radiographed, thus contributing to the stabilization of the image quality.

With such digital radiographic devices, digital images are output as X-ray images. Radiographed X-ray images that are stored online in a data server or the like so that the stored X-ray images can be referred to, instead of outputting the radiographed X-ray images to a printer, have become popular in these days.

In medical fields, for example, in orthopedics, films on which radiation images are printed are not only observed and read, but also are used for the purpose of measuring geometrical information including the spine curvature (Cobb method). In geometrical measurement, measured points are actually marked by using, for example, a red pencil on films on which radiation images are printed and an angle between two straight lines each connecting the marked two points is manually measured by using measuring instruments including a rule and a protractor in order to geometrically measure the radiation images.

In addition, a method for measuring digitized X-ray images on a screen, without printing the images on a film or the like, is disclosed in Japanese Unexamined Patent Application Publication No. 2000-279399.

However, when radiation images, which are radiographed digital images, are displayed in a display device, such as a monitor, for diagnosis, instead of printing the images on a film, measurement using a protractor or a rule on the monitor increases the burden on a doctor and, therefore, it is difficult to measure the images and the measurement accuracy is disadvantageously decreased.

SUMMARY OF THE INVENTION

In order to solve the problems described above, it is an object of the present invention to provide an information processing system and an information processing method capable of performing geometrical measurement in accordance with an operation of specifying a measurement position on a monitor by a user when radiation images, which are radiographed digital images, are displayed on the monitor for diagnosis, a storage medium, and a program.

The present invention provides, in its first aspect, an information processing system including a display unit for displaying an image; a drawing unit for drawing a first straight line and a second straight line on the image displayed by the display unit in accordance with an input operation by a user; and a geometrical-value calculating unit for calculating a value indicating a geometrical relationship between the first and second straight lines drawn by the drawing unit.

The present invention provides, in its second aspect, an information processing method including a display-instruction step of instructing display of an image; a first step of drawing a first straight line and a second straight line on the image displayed in the display-instruction step in accordance with an input operation by a user; a second step of calculating a value indicating a geometrical relationship between the first and second straight lines drawn in the first step; and a third step of instructing display of the value indicating the geometrical relationship calculated in the second step.

The present invention provides, in its third aspect, a computer-readable storage medium that stores a program to be executed by an information processing system. The program includes a display-instruction step of instructing display of an image; a first step of drawing a first straight line and a second straight line on the image displayed in the display-instruction step in accordance with an input operation by a user; a second step of calculating a value indicating a geometrical relationship between the first and second straight lines drawn in the first step; and a third step of instructing display of the value indicating the geometrical relationship calculated in the second step.

The present invention provides, in its fourth aspect, a program executed by an information processing system. The program includes a display-instruction step of instructing display of an image; a first step of drawing a first straight line and a second straight line on the image displayed in the display-instruction step in accordance with an input operation by a user; a second step of calculating a value indicating a geometrical relationship between the first and second straight lines drawn in the first step; and a third step of instructing display of the value indicating the geometrical relationship calculated in the second step.

Further objects and features of the present invention will become apparent from the following description of the preferred embodiments with reference to the attached drawings.

BRIEF DESCRIPTION OF THE DRAWINGS

FIG. 3 is a flowchart showing the process, shown in FIGS. 1A to 1J, in the information processing system.

FIG. 4 is a flowchart showing a redrawing process in the information processing system.

DESCRIPTION OF THE PREFERRED EMBODIMENTS

Embodiments of the present invention will be described below with reference to the attached drawings.

A schematic structure of an information processing system according to an embodiment of the present invention will now be described. The information processing system for displaying medical image data in a display and performing geometrical measurement for the displayed medical images will be described in this embodiment. Specifically, the information processing system that geometrically measures the spine curvature by using X-ray images (digital images) of the spine radiographed by X-ray equipment will be described.

Figure 7:
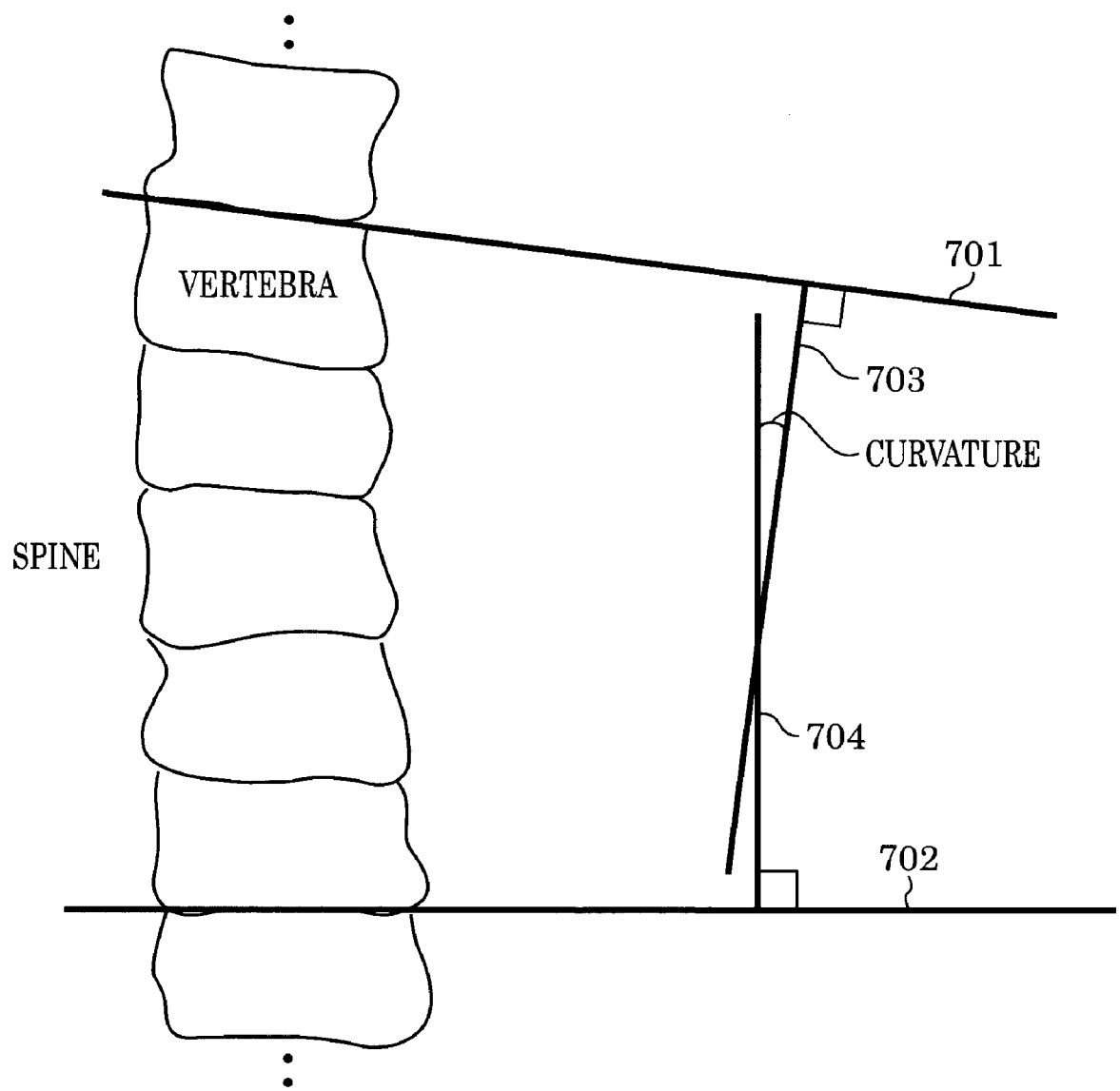
FIG. 7 illustrates a medical image example and an example of geometrical measurement of the medical image.

FIG. 7 illustrates a medical image example and an example of geometrical measurement of the medical image. Specifically, FIG. 7 shows a manner in which the spine curvature is measured in a medical image (X-ray image) of the spine. The spine curvature is an angle between perpendiculars 703 and 704 dropped from extensions 701 and 702 of two boundary lines between two vertebras of the spine. The information processing system of this embodiment provides a user interface that displays such a medical image and with which a user can draw the extensions 701 and 702 on the displayed medical image, and performs a process for measuring the spine curvature, which is the angle between the perpendiculars 703 and 704 dropped from the extensions 701 and 702 drawn by the user.

A hardware structure example of the information processing system of this embodiment, which is, for example, a personal computer or a general-purpose computer, will now be described.

Figure 8:
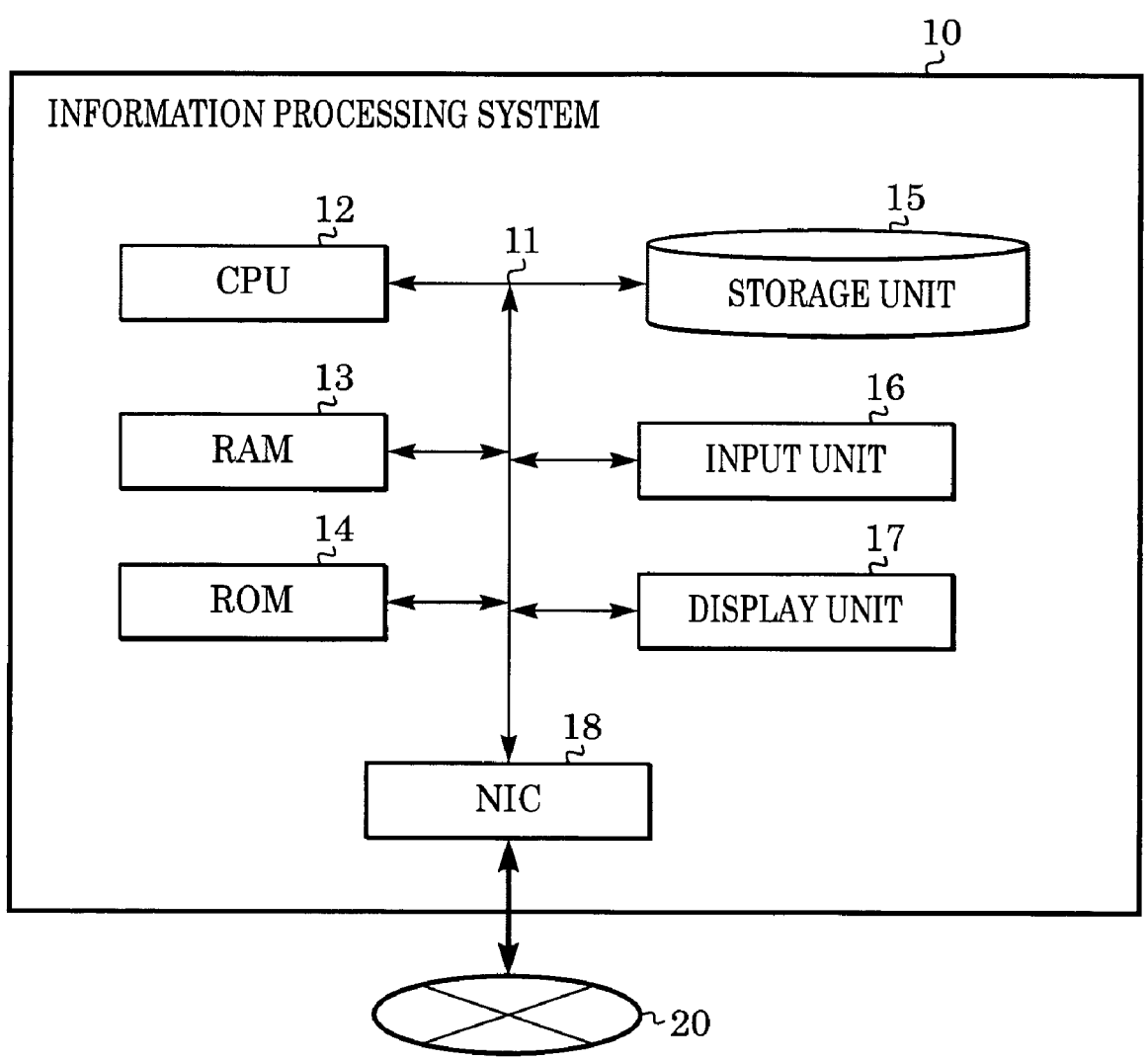
FIG. 8 shows a hardware structure example of the information processing system.

FIG. 8 shows a hardware structure example of the information processing system. An information processing system 10 has a central processing unit (CPU) 12, a random access memory (RAM) 13, a read only memory (ROM) 14, a storage unit 15, an input unit 16, a display unit 17, and a network interface 18, which are connected to a bus 11.

The CPU 12 performs data processing or arithmetic operations and controls various components connected via the bus 11. The CPU 12 reads out and executes programs stored in the ROM 14 or the storage unit 15 to realize a process of displaying a medical image in the display unit 17, a process of providing the user interface for drawing straight lines on the displayed medical image, and/or a geometrical measurement process of the medical image.

The ROM 14 stores, for example, an activation procedure (computer program) of the CPU 12 that executes the computer program at startup for activation. The storage unit 15 stores computer programs for realizing various functions. The CPU 12 reads out the computer programs from the storage unit 15 and writes the readout computer programs in the RAM 13 to execute them. In other words, the RAM 13 is used as a working memory for inputting and outputting data or transmitting and receiving data or a temporary storage for controlling the components. The storage unit 15 is structured to include an operation storage device for storing the operation history of a user. The operation storage device stores information concerning a geometrical change caused by an operation of the user.

The input unit 16 is an input device, such as a keyboard or a mouse. The user operates the input unit 16 to perform various operations or to input data. The display unit 17, which is, for example, a cathode ray tube (CRT) or a liquid crystal display, displays various images or information under the control by the CPU 12. The network interface 18 is an interface for connecting to a network 20 shown in FIG. 8. The network 20 is, for example, a public network such as the Internet or a dedicated line. The information processing system 10 is capable of receiving X-ray image data from an X-ray imaging system (not shown in FIG. 8) or of receiving desired X-ray image data from a data server that stores a lot of X-ray image data, through the network interface 18.

The storage unit 15 is, for example, a flexible disk, which is a storage medium detachable from a hard disk or the information processing system 10. The storage unit 15 is a non-volatile memory, the content of which is not cleared even if the information processing system 10 is turned off. The storage unit 15 may store information concerning straight lines drawn on a medical image by the user or may store medical image data to be processed.

Examples of providing a user interface with which a user can draw arbitrary lines on the displayed medical image and of a geometrical measurement process based on the lines drawn by the user in the information processing system 10 of this embodiment will now be described. FIGS. 1A to 1J are diagrams showing examples of providing a user interface for geometrically measuring the spine curvature and of a measurement process. The steps are performed from FIG. 1A to FIG. 1J in this order. FIG. 3 is a flowchart showing the process, shown in FIGS. 1A to 1J, in the information processing system 10. The process shown in FIGS. 1A to 1J will now be described with reference to the flowchart in FIG. 3. Although an X-ray image (medical image) is omitted for visibility in FIGS. 1A to 1J, straight lines and so on in FIGS. 1A to 1J are actually drawn on the X-ray image.

In Step S301, the information processing system 10 waits for an operation of inputting a first straight line by a user with an X-ray image of a spine being displayed in the display unit 17. After the user draws a straight line parallel to a vertebra of the spine by using a mouse or the like according to the steps shown in FIGS. 1A to 1C, in Step S302, input information concerning the first straight line in accordance with the drawing operation is input in the information processing system 10. In Step S303, the information processing system 10 draws a first straight line 104, which is parallel to the vertebra on the X-ray image, on the X-ray image.

Figure 1A:
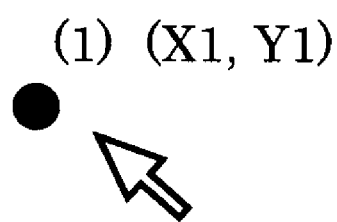
FIGS. 1A to 1J are diagrams showing examples of providing a user interface for geometrically measuring the spine curvature and of a measurement process in an information processing system according to an embodiment of the present invention.
Figure 1B:
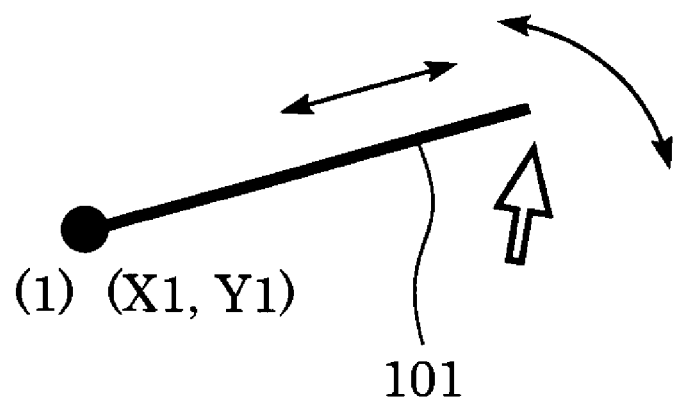
Figure 1C:
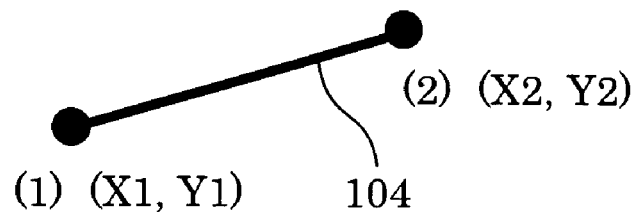

Specifically, the user sets a starting point (1) (X1, Y1) of a first straight line by pointing to the starting point (1) (X1, Y1) on the X-ray image by using the mouse, as shown in FIG. 1A. Hereinafter, (Xn, Yn) represents a coordinate on an image, unless otherwise specified. The information processing system 10 displays a straight line 101, which is a temporary first straight line having a starting point (1) (X1, Y1), on the X-ray image, as shown in FIG. 1B. The endpoint of the straight line 101 can be set at an arbitrary point by the mouse operation by the user. After the user points to an endpoint (2) (X2, Y2) of the straight line 101 by using the mouse to set the endpoint (2), the information processing system 10 draws the first straight line 104 having the starting point (1) (X1, Y1) and the endpoint (2) (X2, Y2) on the X-ray image, as shown in FIG. 1C.

In Step S304, the information processing system 10 waits for an operation of inputting a second straight line by the user with the X-ray image of the spine and the first straight line 104 being displayed in the display unit 17. After the user draws a straight line parallel to another vertebra of the spine by using a mouse or the like according to the steps shown in FIGS. 1D to 1G, in Step S305, input information concerning the second straight line in accordance with the drawing operation is input in the information processing system 10. In Step S306, the information processing system 10 draws on the X-ray image a second straight line 105, which is parallel to a vertebra different from the vertebra for the first straight line 104 on the X-ray image.

Figure 1D:
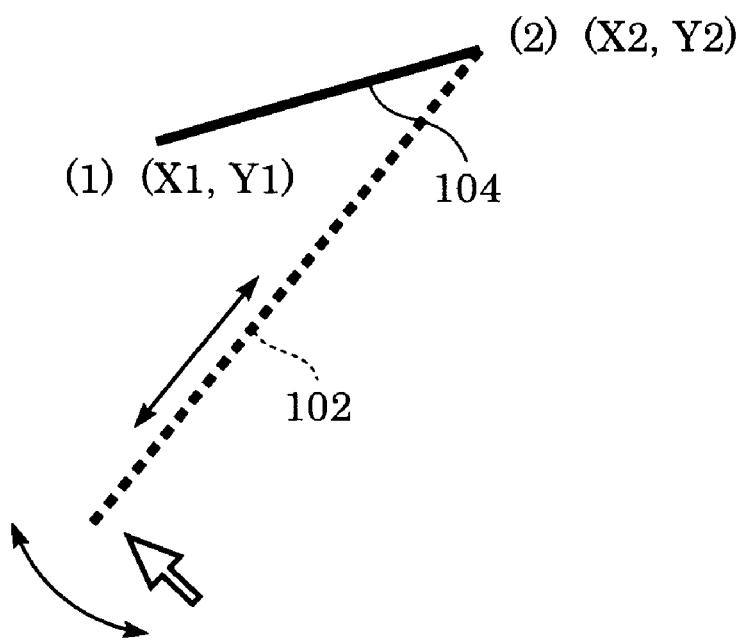
Figure 1E:
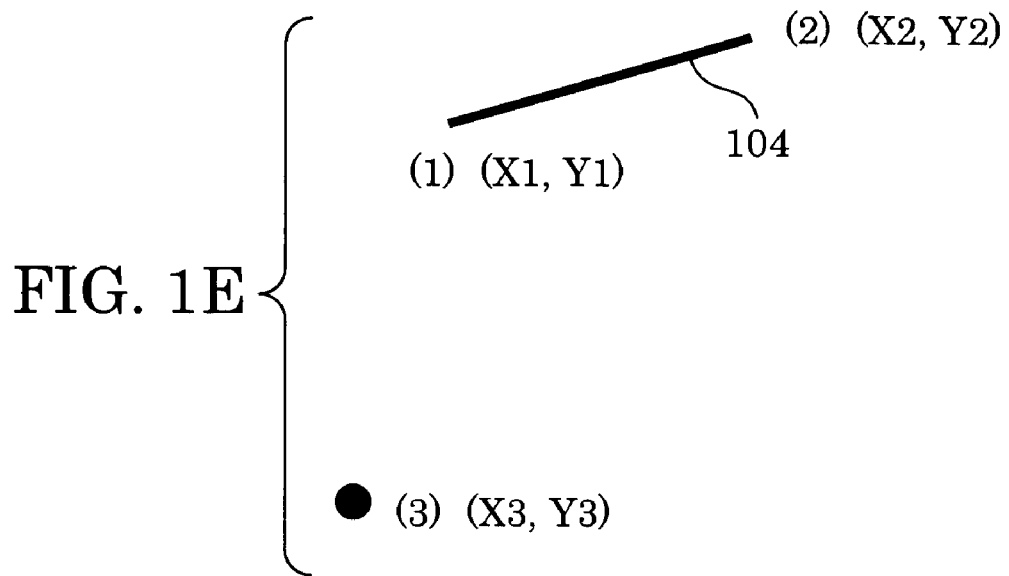
Figure 1F:
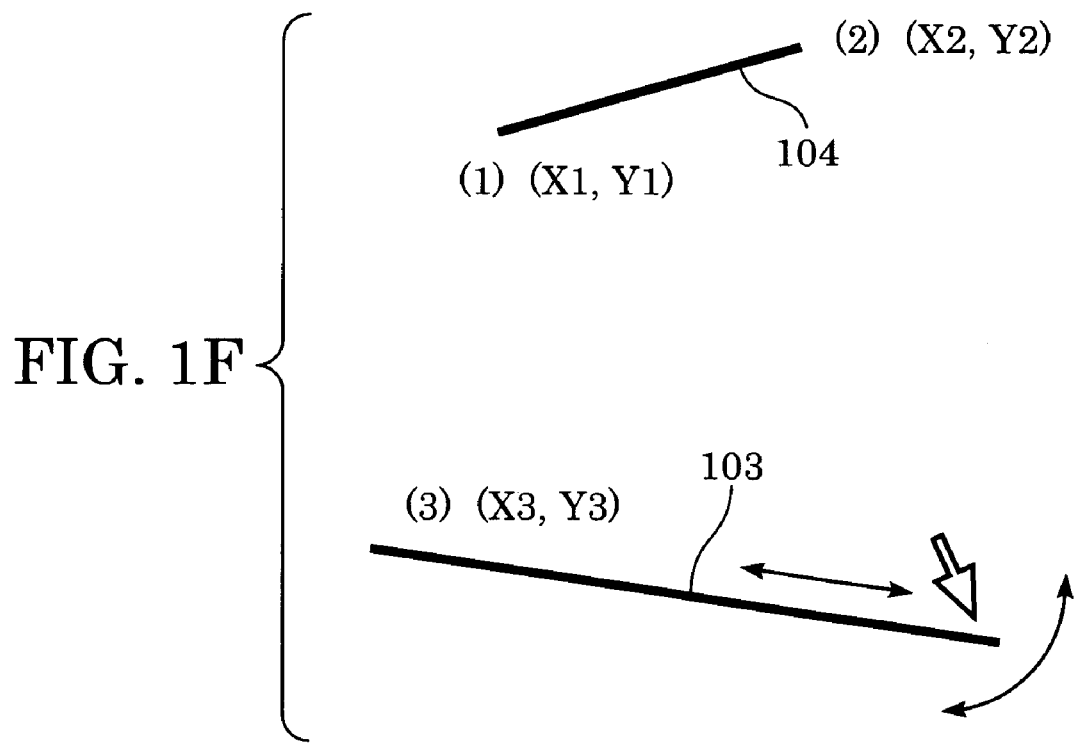
Figure 1G:
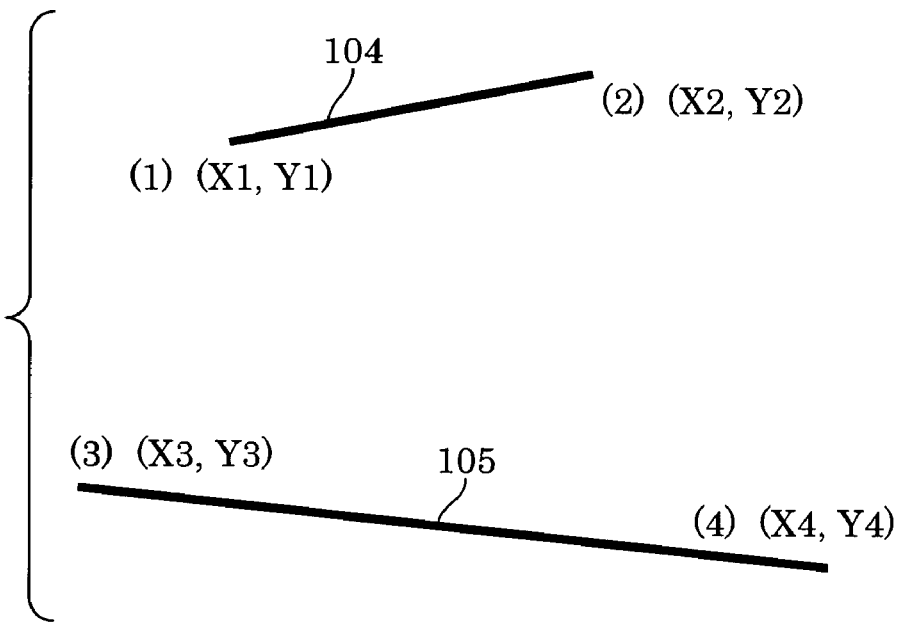

Specifically, after the endpoint (2) (X2, Y2) is set in Step S303, the information processing system 10 displays a guideline 102, shown by a broken line, for guiding a starting point of the second straight line on the X-ray image, as shown in FIG. 1D. The user moves the mouse based on the guideline 102 to determine the starting point of the second straight line and points to the starting point. In this manner, the displayed guideline 102 can easily inform the user that he/she must proceed to the following step. When the user points to a starting point (3) (X3, Y3) of the second straight line, the information processing system 10 displays the starting point (3) (X3, Y3) of the second straight line on the X-ray image, as shown in FIG. 1E. At this time, the information processing system 10 automatically clears the guideline 102 shown in FIG. 1D, displayed for guiding the user, and displays a straight line 103, which is a temporary second straight line, starting from the starting point (3) (X3, Y3) on the X-ray image, as shown in FIG. 1F. The user moves the endpoint of the straight line 103 to an arbitrary point by operating the mouse. If the user points to an endpoint (4) (X4, Y4) shown in FIG. 1G, the information processing system 10 draws the second straight line 105 having the starting point (3) (X3, Y3) and the endpoint (4) (X4, Y4) on the X-ray image, as shown in FIG. 1G.

Figure 1H:
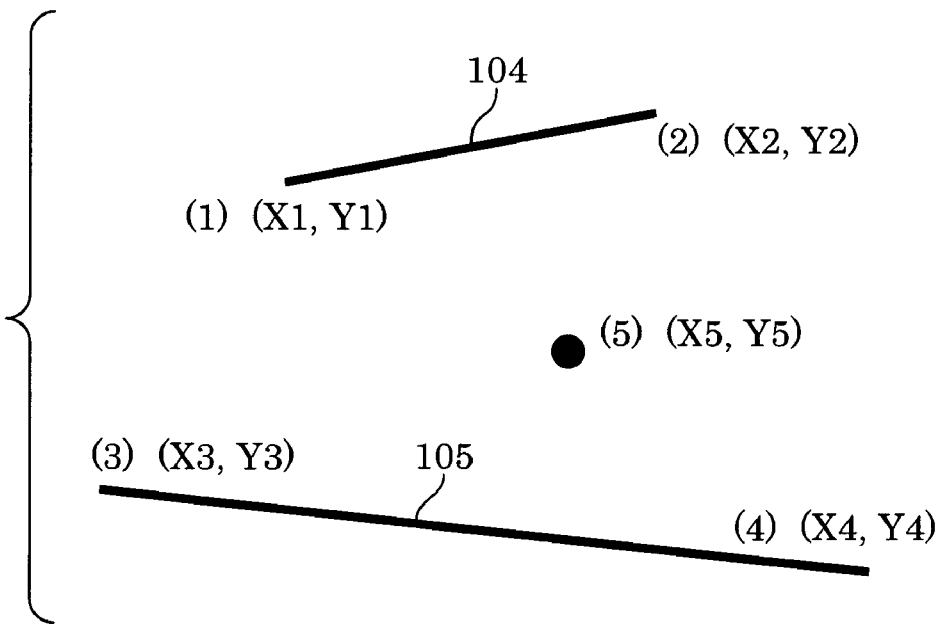

In Step S307, the information processing system 10 calculates a point (5) (X5, Y5), which is a centroid of a tetragon formed by the point (1) (X1, Y1), the point (2) (X2, Y2), the point (3) (X3, Y3), and the point (4) (X4, Y4), as shown in FIG. 1H. Although the point (5) (X5,Y5) is shown in FIG. 1H, this is shown for description and the point (5) (X5, Y5) is not displayed in the X-ray image according to this embodiment.

Specifically, the information processing system 10 calculates the point (5) (X5, Y5) according to the following equations:

[Formula 1]

$$X5=(X1+X2+X3+X4)/4 \quad (1)$$

$$Y5=(Y1+Y2+Y3+Y4)/4 \quad (2)$$

Figure 1I:
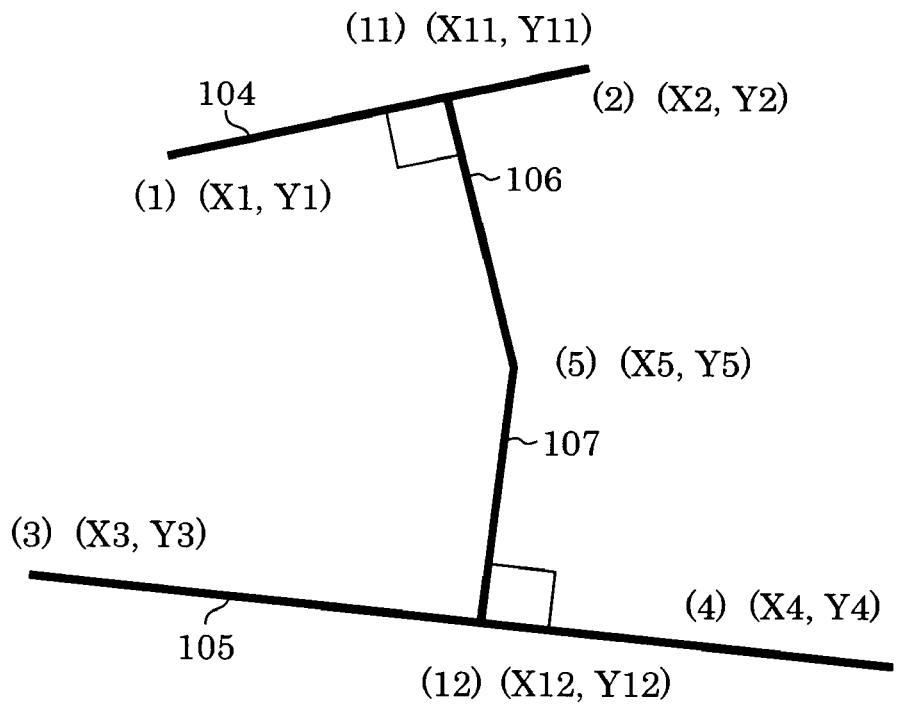

The information processing system 10 drops a perpendicular 106 toward the first straight line 104 drawn in Step S303 from the centroid (5) (X5, Y5) calculated in Step S307, as shown in FIG. 1I. In Step S308, the information processing system 10 determines whether the first straight line 104 intersects with the perpendicular 106 and whether the second straight line 105 intersects with a perpendicular 107 dropped toward the second straight line 105 drawn in Step S306.

Figure 6:
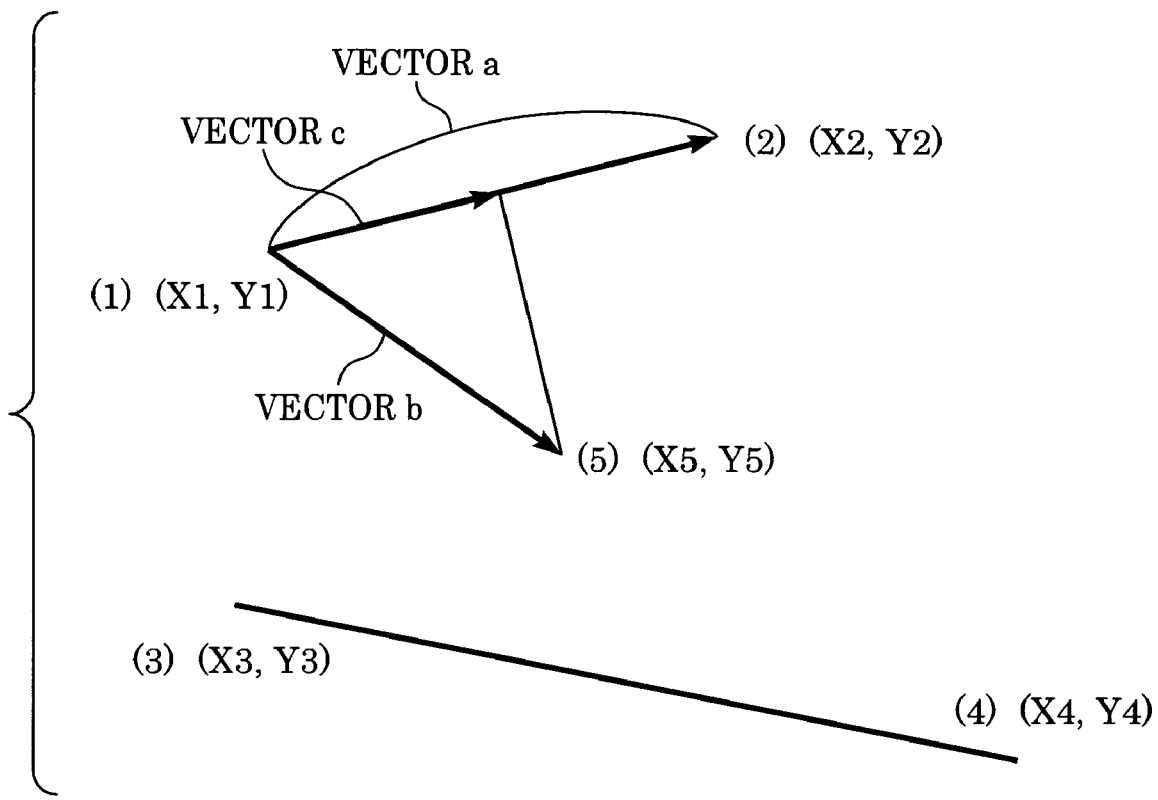
FIG. 6 is a diagram showing how to determine the intersection of a first straight line and a perpendicular.

Specifically, the information processing system 10 determines an intersection (11) (X11, Y11) of the first straight line 104 and the perpendicular 106 and an intersection (12) (X12, Y12) of the second straight line 105 and the perpendicular 107 in a manner described below. First, it will be described how to determine the intersection (11) (X11, Y11). FIG. 6 is a diagram showing how to determine the intersection (11) (X11, Y11) of the first straight line 104 and the perpendicular 106. The information processing system 10 defines the vector between the point (1) (X1, Y1) and the point (2) (X2, Y2) as a vector a (ax, ay), the vector between the point (1) (X1, Y1) and the point (5) (X5, Y5) as a vector b (bx, by), and the vector between the point (1) (X1, Y1) and the point (11) (X11, Y11) as a vector c. Accordingly, an orthogonal projection from the vector a to the vector b is the magnitude of the vector c. However, an angle between the vector a and the vector b is $0 \leq \theta \leq 180$.

First, $\cos \theta$ is determined according to equation (3). Next, as shown by equation (4), the magnitude of the vector c is determined by multiplying the magnitude of the vector b by $\cos \theta$ calculated by equation (3). Furthermore, as shown by equations (5), a value A is determined by dividing the magnitude of the vector c calculated by equation (4) by the magnitude of the vector a (if the angle $\theta$ between the vector a and the vector b is greater than or equal to 90° and less than 180°, a minus sign is included). Accordingly, the vector c is determined from vector c=A×vector a. This equation for determining the vector c is the same as equation (6).

[Formula 2] (3)

$$\cos \theta = \frac{\vec{a} \cdot \vec{b}}{|\vec{a}||\vec{b}|}$$

where $0 \leq \theta < 180$

[Formula 3]

$$|\vec{c}|=|\vec{b}|\cos \theta \quad (4)$$

[Formula 4] (5)

$$\begin{cases} A = \frac{|\vec{c}|}{|\vec{a}|}; (0 \leq \theta < 90) \\ A = \frac{-|\vec{c}|}{|\vec{a}|}; (90 \leq \theta < 180) \end{cases}$$

[Formula 5]

$$\vec{c} = A \vec{a} \quad (6)$$

where $\vec{a}$ denotes vector a $\vec{b}$ denotes vector b $\vec{c}$ denotes vector c The intersection (11) (X11, Y11) is determined according to the following equations:

[Formula 6]

$$X11=Aax+X1 \quad (7)$$

$$Y11=Aay+X2 \quad (8)$$

The intersection (12) (X12,Y12) is determined in the same manner as in the intersection (11) (X11, Y11). In Step S308, the information processing system 10 determines whether the perpendicular 106 dropped from the point (5) (X5, Y5) intersects with the first straight line 104 and whether the perpendicular 107 dropped from the point (5) (X5, Y5) intersects with the second straight line 105, based on whether the intersection (11) (X11, Y11) and the intersection (12) (X12, Y12) are on the first straight line 104 and the second straight line 105, respectively.

Specifically, the information processing system 10 uses the value A calculated according to equation (5) to determine whether the perpendicular 106 dropped from the point (5) (X5, Y5) toward the first straight line 104 intersects with the perpendicular 107 dropped from the point (5) (X5, Y5) toward the second straight line 105. When $0 \leq A \leq 1$, the intersection (11) (X11, Y11) is on the first straight line 104 having the starting point (1) (X1, Y1) and the endpoint (2) (X2, Y2). When A<0 or A>1, the intersection (11) (X1, Y11) is not on the first straight line 104 having the starting point (1) (X1, Y1) and the endpoint (2) (X2, Y2).

If information processing system 10 determines, in Step S308, that the perpendicular 106 dropped from the point (5) (X5, Y5) intersects with the first straight line 104 and that the perpendicular 107 dropped from the point (5) (X5, Y5) intersects with the second straight line 105, the information processing system 10 proceeds to Step S311 and draws the perpendiculars 106 and 107 on the X-ray image. If the information processing system 10 determines, in Step S308, that the perpendicular 106 dropped from the point (5) (X5, Y5) does not intersect with the first straight line 104 or that the perpendicular 107 dropped from the point (5) (X5, Y5) does not intersect with the second straight line 105, the information processing system 10 performs a process shown in FIG. 2B.

Figure 2A:
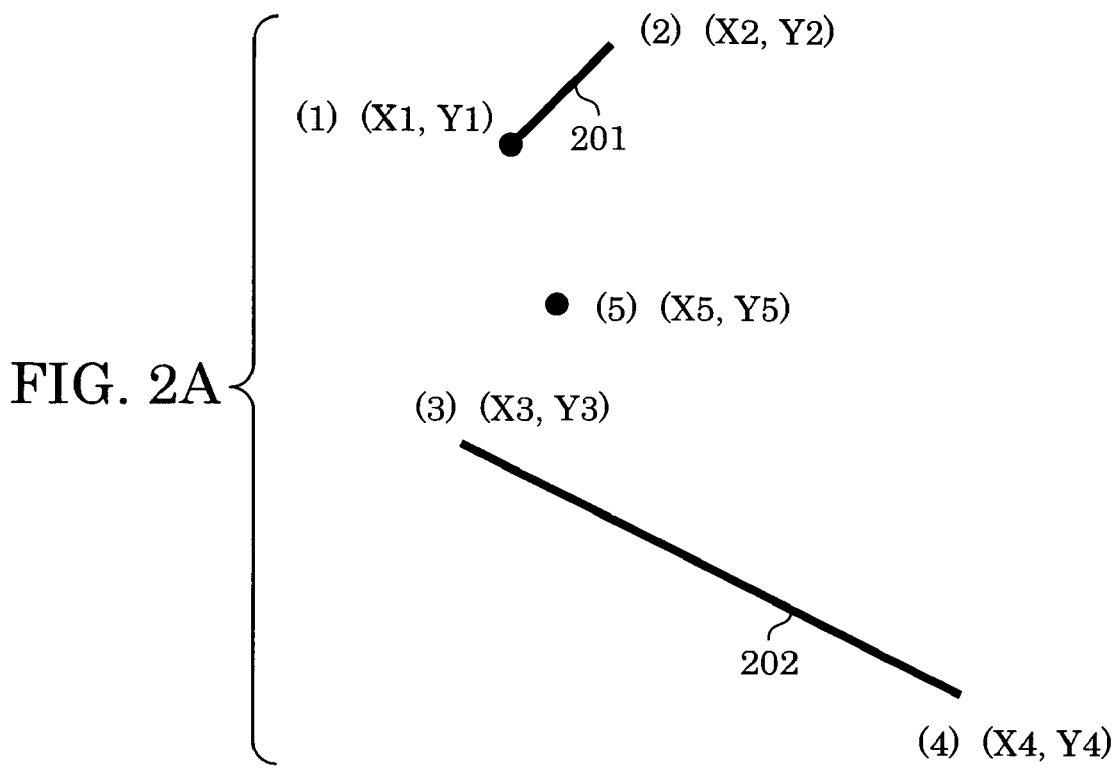
FIG. 2A is illustrates a straight line with which a perpendicular from a point does not intersect.
Figure 2B:
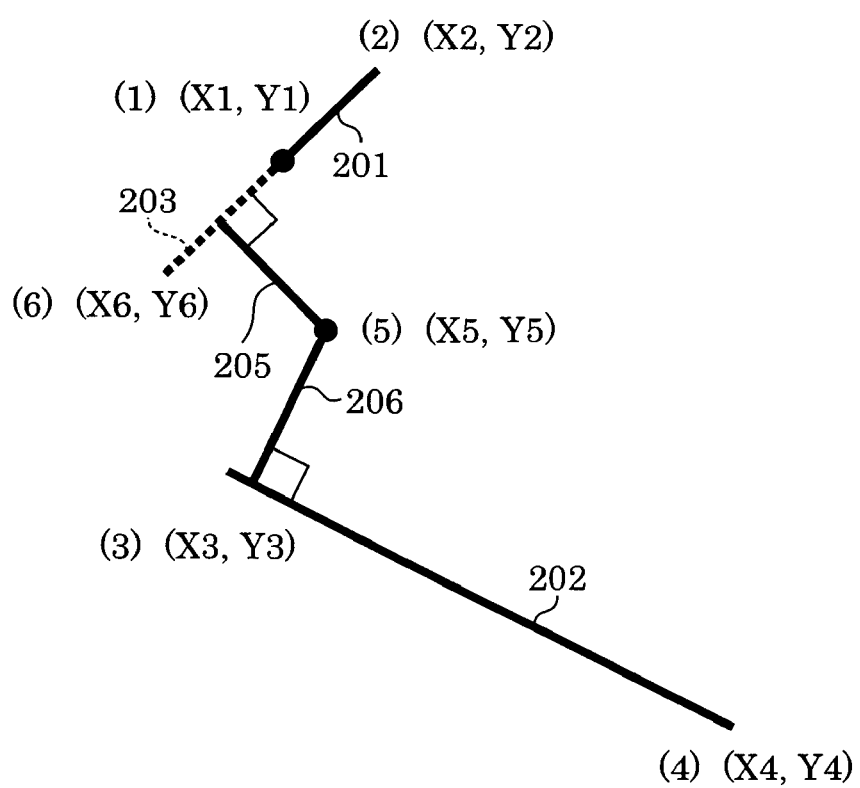
FIG. 2B illustrates a process of drawing a perpendicular toward the straight line, shown in FIG. 2A, with which the perpendicular from the point does not intersect.

An example of the first and second straight lines and the corresponding process when the perpendiculars dropped from the point (5) (X5, Y5) do not intersect with the straight lines will now be described with reference to FIGS. 2A and 2B. FIG. 2A illustrates an example of a straight line with which the perpendicular dropped from the point (5) (X5, Y5) does not intersect. Referring to FIG. 2A, a first straight line 201 is the straight line drawn in Step S303 and a second straight line 202 is the straight line drawn in Step S306. The angle between an extension of the first straight line 201 and an extension of the second straight line 202 is greater than the angle between the extension of the first straight line 104 and the extension of the second straight line 105 shown in FIG. 1I. In such a case, a perpendicular 205 dropped from the point (5) (X5, Y5) toward the first straight line 201 does not intersect with the first straight line 201. Hence, in this case, in Step S310, the information processing system 10 draws an extension 203 that extends toward a position where the perpendicular 205 intersects with the first straight line 201, as shown in FIG. 2B. Referring to FIG. 2B, although the second straight line 202 intersects with the a perpendicular 206, the second straight line 202 extends toward a position where the perpendicular 206 intersects with the second straight line 202 if the second straight line 202 does not intersect with the perpendicular 206.

After the information processing system 10 confirms that the extension 203 intersects with the perpendicular 205 and that the second straight line 202 intersects with the perpendicular 206, in Step S311, the information processing system 10 draws the perpendicular 205 dropped from the point (5) (X5, Y5) toward the extension 203 of the first straight line 201 and the perpendicular 206 dropped from the point (5) (X5, Y5) toward the second straight line 202. The straight lines and the perpendiculars shown in FIG. 2B are drawn on the X-ray image in this manner. As described above, the information processing system 10 of this embodiment can draw the straight lines and the perpendiculars on the X-ray image even if the straight lines dropped from the point (5) (X5, Y5) do not intersect with the first and second straight lines.

Figure 1J:
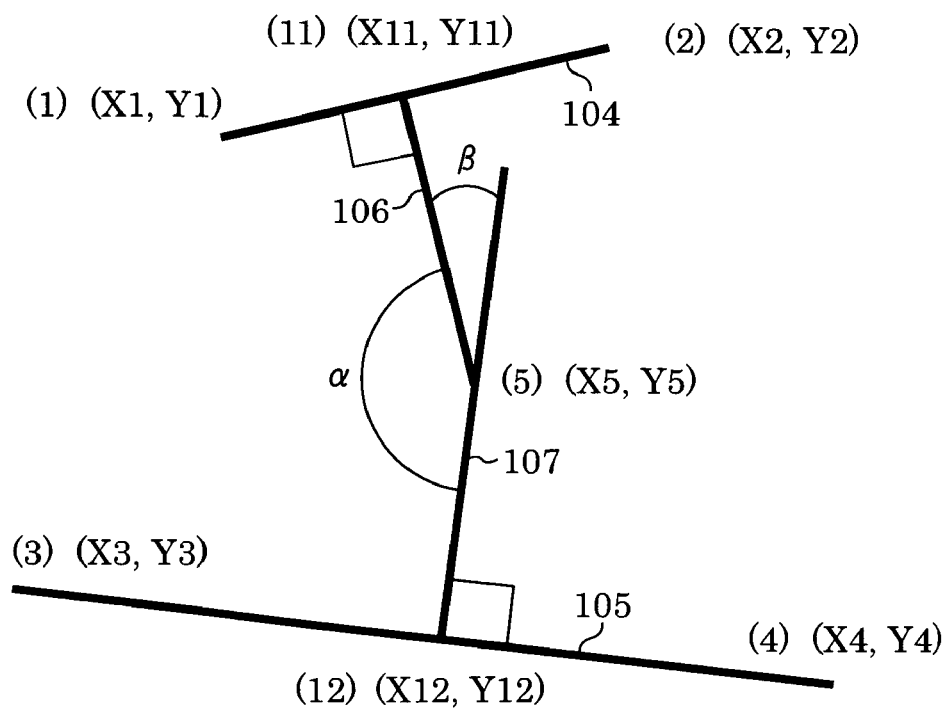

The steps after the perpendiculars 106 and 107 are drawn in Step S311, as shown in FIG. 1I, if the determination is affirmative in Step S308 in FIG. 3, will now be described. In Step S312, the information processing system 10 calculates angles α and β between the perpendicular 106 and the perpendicular 107 and displays the values of the angles α and β in the display unit 17, as shown in FIG. 1J. At this time, the information processing system 10 calculates the angles α and β in the following manner. First, the angle α is determined according to the following equation (9):

[Formula 7] (9)

$$\alpha = \cos^{-1}\left\{\frac{(\vec{c} \cdot \vec{q})}{(|\vec{p}||\vec{q}|)}\right\}$$

where $\vec{p}$ denotes vector $p$ $\vec{q}$ denotes vector $q$ $0 \leq \alpha < 180$ where a vector p denotes the vector between the point (5) (X5, Y5) and the intersection (11) (X11, Y11) and a vector q denotes the vector between the point (5) (X5, Y5) and the intersection (12) (X12, Y12).

The angle β is determined according to the following equation (10):

[Formula 8]

$$\beta = 180 - \alpha \quad (10)$$

After the angles α and β are calculated, in Step S313, the information processing system 10 writes a value indicating that the intersection of the perpendicular 106 of the first straight line 104 and the perpendicular 107 of the second straight line 105 is not moved, in the operation storage device in the storage unit 15 shown in FIG. 8 as data for redrawing. The information processing system 10 can determine the curvature or the like on the displayed X-ray image in the process of drawing the perpendiculars and calculating the angles α and β (geometrical measurement process of medical images).

Although the information processing system 10 of this embodiment drops the perpendiculars from the point (5) (X5, Y5), which is the centroid of the tetragon formed by the point (1) (X1, Y1), the point (2) (X2, Y2), the point (3) (X3, Y3), and the point (4) (X4, Y4), toward the first straight line 104 and the second straight line 105, as shown in FIG. 1I, the point from which the perpendiculars are dropped is not limited to the centroid. For example, the user may plot an arbitrary point, instead of the centroid, by using the mouse and may drop perpendiculars from the point toward the first straight line 104 and the second straight line 105.

Figure 9A:
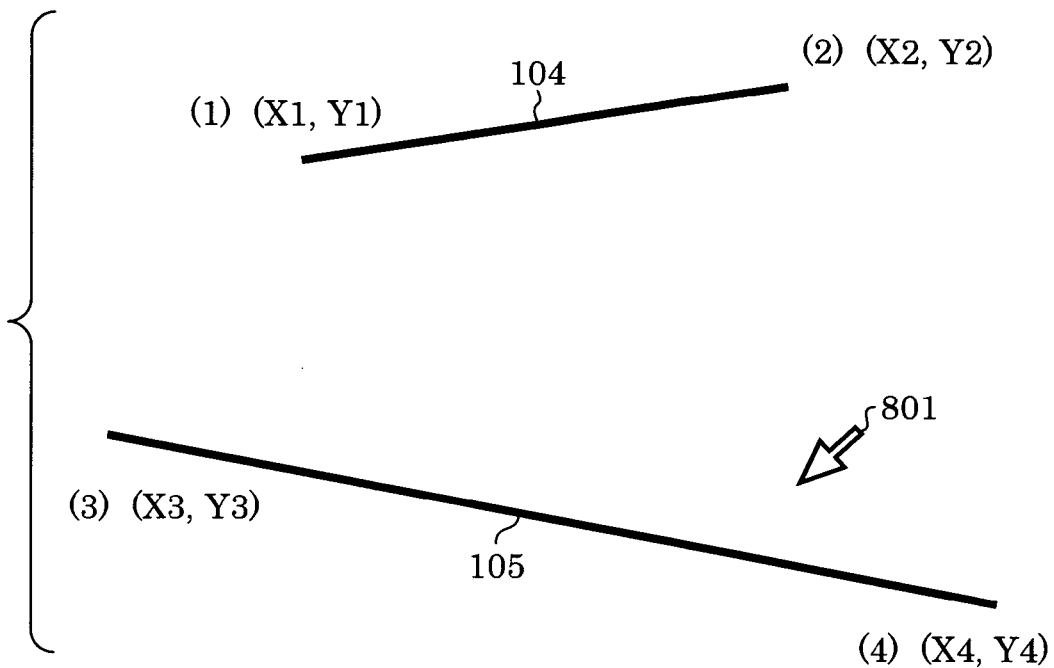
FIG. 9A is a diagram immediately after the endpoint of a second straight line is determined.
Figure 9B:
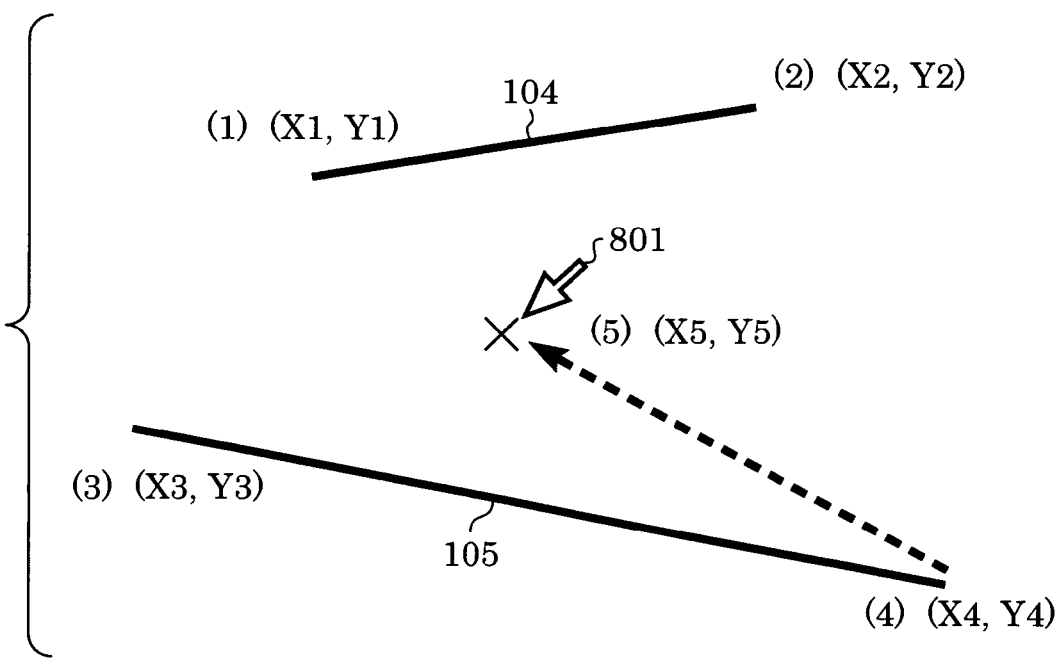
FIG. 9B illustrates an example of controlling the position of a pointer after the endpoint of a second straight line is determined.

A manner in which the user specifies an arbitrary point as the intersection with a perpendicular by using the mouse will now be described. FIG. 9A is a diagram immediately after the endpoint of the second straight line 105 is determined. A pointer 801 is located at an arbitrary point. The information processing system 10 moves the pointer 801 to the point (5) (X5, Y5), which is the centroid of the tetragon formed by the point (1) (X1, Y1), the point (2) (X2, Y2), the point (3) (X3, Y3), and the point (4) (X4, Y4), as shown in FIG. 9B. The user moves from the centroid (5) (X5, Y5) to an arbitrary point to specify the point as the intersection of the perpendicular toward the first straight line 104 and the perpendicular toward the second straight line 105. In this case, the first straight line 104 is extended until it intersects with the perpendicular toward the first straight line 104 if the perpendicular toward the first straight line 104 does not intersect with the first straight line 104, as in the case in which the perpendiculars are dropped from the centroid (5) (X5, Y5) toward the first and second straight lines. Similarly, the second straight line 105 is extended until it intersects with the perpendicular toward the second straight line 105 if the perpendicular toward the second straight line 105 does not intersect with the second straight line 105.

A case in which the intersection of the perpendicular from the first straight line and the perpendicular from the second straight line does not exist at a position to be measured will be described. In such a case, the user changes the first or second straight line or directly moves the intersection by using the mouse to move the intersection of the perpendicular from the first straight line and the perpendicular from the second straight line to a desired position. A process of moving the intersection in the information processing system 10 will now be described.

When the user changes the length of the first straight line or the second straight line by using the mouse, the information processing system 10 moves the centroid of the tetragon having the first and second straight lines as opposite sides in accordance with the user operation. In other words, when the intersection of the perpendicular from the first straight line and the perpendicular from the second straight line coincides with the centroid, the information processing system 10 moves the position of the intersection in accordance with the operation of changing the first and second straight lines by the user. However, after the user has directly moved the intersection to a position other than the centroid by using the mouse, even when the user changes the length of the first or second straight line to move the centroid, the information processing system 10 cannot automatically move the intersection because the intersection of the perpendiculars does not coincide with the centroid. That is, the intersection of the perpendicular from the first straight line and the perpendicular from the second straight line is not moved in conjunction with the change of the first or second straight line.

The intersection of the perpendiculars that is not moved in conjunction with the change of the straight line has the following advantage. For example, when the intersection, which is the centroid, is drawn in an area of interest of a doctor, moving the intersection outside the area of interest by the user permits accurate diagnosis without the effect on the area of interest because the intersection does not move even when the position of the straight line is changed later (even when the straight line is redrawn).

A redrawing process in the information processing system 10 will now be described.

Figure 5A:
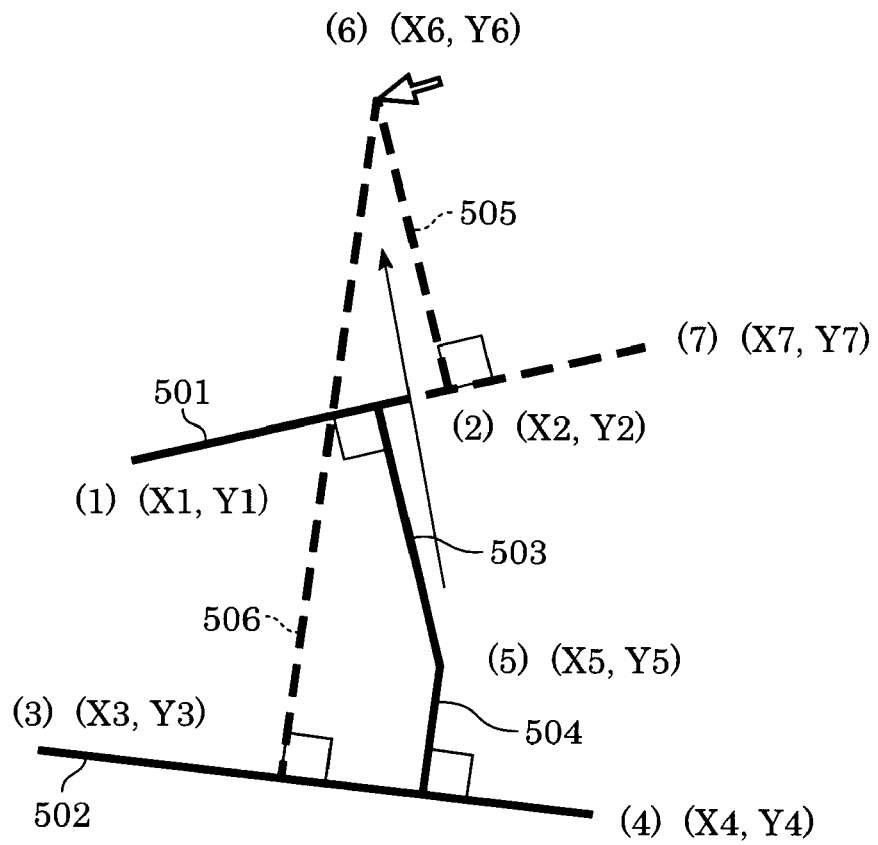
FIG. 5A illustrates a manner in which an intersection is directly moved when the intersection of a perpendicular from a first straight line and a perpendicular from a second straight line does not exist at a position to be measured.

FIG. 4 is a flowchart showing the redrawing process in the information processing system 10. FIG. 5A illustrates a manner in which an intersection is directly moved when the intersection of the perpendicular from the first straight line and the perpendicular from the second straight line does not exist at a position to be measured. Referring to FIG. 5A, an intersection (5) (X5, Y5) of a perpendicular 503 from a first straight line 501 and a perpendicular 504 from a second straight line 502 does not exist at a position where the user wants to measure the curvature. Accordingly, a perpendicular 505 is dropped from a point (6) (X6, Y6) specified by the user toward the first straight line 501 and a perpendicular 506 is dropped from the point (6) (X6, Y6) toward the second straight line 502. A process of specifying an intersection by the user, shown in FIG. 5A, will now be described with reference to FIG. 4.

When the first straight line 501, the perpendicular 503, the second straight line 502, the perpendicular 504, and the intersection (5) (X5, Y5) of the perpendiculars 503 and 504 shown in FIG. 5A are displayed in accordance with the flowchart in FIG. 3, in Step S401, the information processing system 10 waits in a state where the first straight line 501, the second straight line 502, and the intersection (5) (X5, Y5) can be changed in accordance with the mouse operation by the user. In Step S402, the information processing system 10 changes the length of the first straight line 501 or the second straight line 502 or moves the position of the intersection (5) (X5, Y5) in accordance with the mouse operation by the user. In other words, when the intersection (5) (X5, Y5) of the perpendicular 503 from the first straight line 501 and the perpendicular 504 from the second straight line 502 does not exist at a position to be measured, the user moves the intersection (5) (X5, Y5) to the point (6) (X6, Y6) by using the mouse to redetermine the position of the intersection.

In Step S403, the information processing system 10 determines whether the user moves the intersection. If the user moves the intersection (the determination is affirmative in Step S403), in Step S404, the information processing system 10 reads the position data of the intersection from the operation storage device in the storage unit 15 shown in FIG. 8. In Step S405, the information processing system 10 determines whether the position data of the intersection (5) (X5, Y5) of the perpendicular 503 from the first straight line 501 and the perpendicular 504 from the second straight line 502 is updated to the new position data. If the position data of the intersection (5) (X5, Y5) of the perpendicular 503 from the first straight line 501 and the perpendicular 504 from the second straight line 502 is updated to the new position data (the determination is affirmative in Step S405), the information processing system 10 proceeds to Step S407 to redraw the intersection at a position corresponding to the new position data. Specifically, the information processing system 10 redraws the intersection at the point (6) (X6, Y6) in FIG. 5A.

If the position data of the intersection (5) (X5, Y5) of the perpendicular 503 from the first straight line 501 and the perpendicular 504 from the second straight line 502 is not updated to the new position data (the determination is negative in Step S405), in Step S406, the information processing system 10 writes the new position data of the intersection in the operation storage device in the storage unit 15 and stores it. In Step S407, the information processing system 10 redraws the intersection in accordance with the new position data read out from the operation storage device.

In Step S414, the information processing system 10 determines whether the perpendicular 505 dropped from the updated point (6) (X6, Y6) toward the first straight line 501 intersects with the first straight line 501 and whether the perpendicular 506 dropped from the point (6) (X6, Y6) toward the second straight line 502 intersects with the second straight line 502. If the information processing system 10 determines that the perpendicular 505 dropped from the updated point (6) (X6, Y6) toward the first straight line 501 does not intersect with the first straight line 501 or that the perpendicular 506 dropped from the point (6) (X6, Y6) toward the second straight line 502 does not intersect with the second straight line 502 (the determination is negative in Step S414), in Step S416, the information processing system 10 extends the first straight line 501 or the second straight line 502 until it intersects with the corresponding perpendicular. Specifically, the information processing system 10 extends the endpoint of the first straight line 501 to an extension point (7) (X7, Y7) because the first straight line 501 does not intersect with the perpendicular 505, as shown in FIG. 5A.

If the information processing system 10 determines that that the perpendicular 505 dropped from the updated point (6)

(X6, Y6) toward the first straight line 501 intersects with the first straight line 501 or that the perpendicular 506 dropped from the point (6) (X6, Y6) toward the second straight line 502 intersects with the second straight line 502 (the determination is affirmative in Step S414), in Step S417, the information processing system 10 calculates drawing positions of the perpendicular 505 dropped from the point (6) (X6, Y6) toward the first straight line 501 and the perpendicular 506 dropped from the point (6) (X6, Y6) toward the second straight line 502 to draw the perpendiculars 505 and 506, in the same manner as in Step S311 in FIG. 3. In Step S418, the information processing system 10 calculates an angle between the perpendiculars 505 and 506, in the same manner as in Step S312 in FIG. 3, to determine an angle between the redrawn perpendiculars.

Figure 5B:
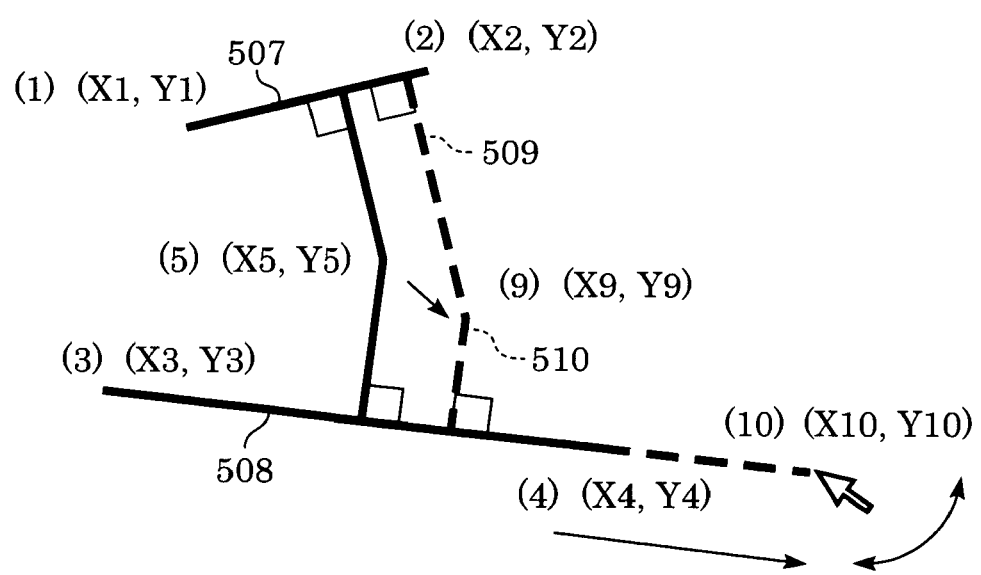
FIG. 5B illustrates a manner in which the length of a first straight line or a second straight line is changed to change the position of the intersection.

A case in which, instead of changing the position of the intersection by the user, the position of the first or second straight line is changed to change the position of the intersection will now be described. FIG. 5B illustrates a manner in which the length of a first straight line 507 or a second straight line 508 is changed to change the position of the intersection (5) (X5, Y5). Referring to FIG. 5B, when the endpoint (4) (X4, Y4) of the second straight line 508 is moved to an endpoint (10) (X10, Y10), the information processing system 10 moves the intersection (5) (X5, Y5) to the position of an intersection (9) (X9, Y9). Specifically, in Step S408, the information processing system 10 determines whether the starting point or the endpoint of the first straight line 507 or the second straight line 508 is moved. If the user moves the endpoint of the second straight line 508 to the endpoint (10) (X10, Y10) (the determination is affirmative in Step S408), in Step S409, the information processing system 10 extends the second straight line 508 to redraw it. In Step S410, the information processing system 10 reads out the intersection position data from the operation storage device in the storage unit 15. In Step S411, the information processing system 10 determines whether the intersection (9) (X9, Y9) of a perpendicular 509 from the first straight line 507 and a perpendicular 510 from the second straight line 508 is moved.

If the position data of the intersection (9) (X9, Y9) of the perpendicular 509 from the first straight line 507 and the perpendicular 510 from the second straight line 508 is changed (the determination is affirmative in Step S411), the information processing system 10 proceeds to Step S414 because the information processing system 10 cannot move the intersection of the perpendicular from the first straight line 507 and the perpendicular from the second straight line 508 even when the position of the first straight line 507 or the second straight line 508 is changed. For example, the information processing system 10 determines that the point (9) (X9, Y9) is set to a position to be measured based on the intersection (5) (X5, Y5) that is moved to the point (9) (X9, Y9) and fixes the point (9) (X9, Y9). This fixing step causes the measurement environment not to be easily changed. Before proceeding to Step S414, the information processing system 10 draws perpendiculars toward the first straight line 507 and the second straight line 508 from the fixed intersection (9) (X9, Y9), which is moved by the user.

If the point (5) (X5, Y5) is not an intersection that is directly moved, as shown in FIG. 5B (the determination in Step S411 is negative), in Step S412, the information processing system 10 calculates the position of a point (9) that is the centroid of the tetragon formed by the point (1) (X1, Y1), the point (2) (X2, Y2), the point (3) (X3, Y3), and the point (4) (X4, Y4). In Step S413, the information processing system 10 draws the calculated centroid (9) as the intersection (9) (X9, Y9).

In Step S414, the information processing system 10 determines whether the perpendicular 509 dropped from the updated point (9) (X9, Y9) toward the first straight line 507 intersects with the first straight line 507 and whether the perpendicular 510 dropped from the point (9) (X9, Y9) toward the second straight line 508 intersects with the second straight line 508. If the perpendicular 509 and/or the perpendicular 510 do not intersect with the first straight line 507 and/or the second straight line 508, respectively (the determination is negative in Step S414), in Step S416, the information processing system 10 extends the first straight line 507 or the second straight line 508 to a position where the perpendicular 509 or the perpendicular 510 intersects with the first straight line 507 or the second straight line 508, respectively. In Step S417, the information processing system 10 draws the perpendicular 509 dropped from the calculated intersection (9) (X9, Y9) toward the first straight line 507 and the perpendicular 510 dropped from the calculated intersection (9) (X9, Y9) toward the second straight line 508. In Step S418, the information processing system 10 calculates an angle between the perpendicular 509 and the perpendicular 510 to determine an angle between the redrawn perpendiculars.

Although the X-ray images are processed in the information processing system 10 described above, the images to be processed are not limited to the X-ray images. Other kinds of images may be processed.

Although the programs for realizing various processing functions in the information processing system 10 are read out from a memory (for example, the storage unit 15) that is executed by the CPU 12 to realize the functions in the above embodiment, the implementation is not limited to the above manner. All or part of the processing functions may be realized by dedicated hardware.

The memory may be a nonvolatile memory including a magneto-optical disk device and a flash memory, a read-only storage medium including a CD-ROM, a volatile memory other than a RAM, or a computer-readable-and-writable storage medium that is a combination of the above media.

A variety of processing may be performed by a computer system that reads and executes the programs, stored in a computer-readable storage medium, for realizing the functions for the variety of processing in the information processing system 10 described above. The "computer system" here includes an OS or hardware including peripheral devices.

The "computer-readable storage medium" means a storage device including a portable medium such as a flexible disk, a magneto-optical disk, a ROM, or a CD-ROM, or a hard disk incorporated in the computer system. In addition, the "computer-readable storage medium" includes a medium that stores the programs during a predetermined period, like a volatile memory (RAM) in the computer system serving as a server or a client when the programs are transmitted over a network including the Internet or a communication line including a telephone line.

The above programs may be transmitted from the computer system having the programs stored in a storage device or the like to another computer system over a transmission medium or through transmitted waves in the transmission medium. The "communication medium" for transmitting the programs means a medium having a function for transmitting information, like a network (communication network) including the Internet or a communication line (communication wire) including a telephone line.

Furthermore, the above programs may realize part of the functions described above. Alternatively, they may be programs that can realize the functions described above in combination with programs that have been already stored in the computer system, that is, may be so-called difference files (difference programs).

The present invention may also be embodied by a program product, such as a computer-readable storage medium, that stores the above programs. The programs, the storage medium, the transmission medium, and the program product described above are within in the scope of the present invention.

While the present invention has been described with reference to what are presently considered to be the preferred embodiments, it is to be understood that the invention is not limited to the disclosed embodiments. On the contrary, the invention is intended to cover various modifications and equivalent arrangements included within the spirit and scope of the appended claims. The scope of the following claims is to be accorded the broadest interpretation so as to encompass all such modifications and equivalent structures and functions.

This application claims priority from Japanese Patent Application No. 2003-314268 filed Sep. 5, 2003, which is hereby incorporated by reference herein.

What is claimed is:

1. An information processing system comprising:
a drawing unit for drawing a first straight line and a second straight line on an image displayed by a display unit in accordance with an input operation from an input unit; and
a geometrical-value calculating unit for calculating a centroid of a tetragon formed by a starting point and an endpoint of the first straight line and a starting point and an endpoint of the second straight line, and calculating an angle between a first perpendicular toward the first straight line and a second perpendicular toward the second straight line, the first and second perpendiculars being drawn from the centroid of tetragon,
wherein the drawing unit draws the first and second perpendiculars from the centroid of the tetragon on the image.

2. The information processing system according to claim 1, wherein the drawing unit draws the first and second straight lines on the image by allowing a user to specify the starting points and the endpoints of the first and second straight lines.

3. The information processing system according to claim 2, wherein the drawing unit displays a guideline to draw the starting point of the second straight line after drawing the first straight line.

4. The information processing system according to claim 2, wherein the drawing unit further includes a function that changes the starting points and the endpoints of the drawn first and second straight lines in accordance with an input operation from the input unit.

5. The information processing system according to claim 2, wherein the drawing unit displays a pointer for specifying at least the starting point and the endpoint of the first straight line and the starting point and the endpoint of the second straight line in accordance with the input operation from an input unit, and
wherein the pointer moves to the position of the centroid of the tetragon formed by the starting point and the endpoint of the first straight line and the starting point and the endpoint of the second straight line, after specifying the starting point and the endpoint of the first straight line and the starting point and the endpoint of the second straight line.

6. The information processing system according to claim 1, wherein the geometrical-value calculating unit calculates at least one of the angle between the first and second perpendiculars and a supplementary angle of the angle between the first and second perpendiculars.

7. The information processing system according to claim 1, wherein the display unit displays the angle calculated by the geometrical-value calculating unit on the image.

8. The information processing system according to claim 1, further comprising:
a change control unit that does not change the position of the intersection in accordance with a change in starting points and endpoints of the first and second straight lines when the position of the intersection of the first and second perpendiculars drawn on the image is not specified, and that changes the position of the intersection in accordance with a change in the starting points and the endpoints of the first and second straight lines when the position of the intersection of the first and second perpendiculars drawn on the image is not specified.

9. The information processing system according to claim 1, wherein the geometrical-value calculating unit further comprises:
a determination unit for determining whether the first straight line intersects with the first perpendicular and whether the second straight line intersects with the second perpendicular; and
an extension unit for extending the first or second straight line so as to intersect with the first or second perpendicular if the determination unit determines that the first straight line does not intersect with the first perpendicular and/or the second straight line does not intersect with the second perpendicular.

10. An information processing method comprising:
displaying an image;
drawing a first straight line and a second straight line on the displayed image in accordance with an input operation from an input unit;
calculating a centroid of a tetragon formed by a starting point and an endpoint of the first straight line and a starting point and an endpoint of the second straight line;
drawing a first perpendicular toward the first straight line and a second perpendicular toward the second straight line from the centroid of the tetragon on the image;
calculating an angle between the first perpendicular toward the first straight line and the second perpendicular toward the second straight line; and
instructing display of the calculated angle.

11. The information processing method according to claim 10,
wherein the first and second straight lines are drawn on the image by specifying starting points and endpoints of the first and second straight lines.

12. The information processing method according to claim 11,
wherein a display of a guideline to draw the starting point of the second straight line is instructed after drawing the first straight line.

13. The information processing method according to claim 11, further comprising:
changing the starting points and the endpoints of the drawn first and second straight lines in accordance with an input operation from the input unit.

14. The information processing method according to claim 11,
wherein a pointer for specifying at least the starting point and the endpoint of the first straight line and the starting point and the endpoint of the second straight line in accordance with the input operation from an input device is displayed, and wherein the pointer moves to the position of the centroid of a tetragon formed by the starting point and the endpoint of the first straight line and the starting point and the endpoint of the second straight line, after specifying the starting point and the endpoint of the first straight line and the starting point and the endpoint of the second straight line.

15. The information processing method according to claim 10, wherein at least one of the angle between the first and second perpendiculars and a supplementary angle of the angle between the first and second perpendiculars is calculated.

16. The information processing method according to claim 10, wherein calculating an angle between the first perpendicular toward the first straight line and the second perpendicular toward the second straight line further comprises:

determining whether the first straight line intersects with the first perpendicular and whether the second straight line intersects with the second perpendicular; and extending the first or second straight line so as to intersect with the first or second perpendicular if it is determined that the first straight line does not intersect with the first perpendicular and/or the second straight line does not intersect with the second perpendicular.

17. A computer-readable storage medium that stores a program to be executed by an information processing system, the program comprising:

displaying an image;

drawing a first straight line and a second straight line on the displayed image in accordance with an input operation from an input device;

calculating a centroid of a tetragon formed by a starting point and an endpoint of the first straight line and a starting point and an endpoint of the second straight line;

drawing a first perpendicular toward the first straight line and a second perpendicular toward the second straight line from the centroid of the tetragon on the image;

calculating an angle between the first perpendicular toward the first straight line and the second perpendicular toward the second straight line; and instructing display of the calculated angle.

* * * * *